(12) United States Patent
Tsai

(10) Patent No.: US 12,495,804 B2
(45) Date of Patent: Dec. 16, 2025

(54) CUTTING, FORMING, AND ADJUSTING DEVICE FOR FOOD PROCESSING MACHINE

(71) Applicant: HUNDRED MACHINERY ENTERPRISE CO., LTD., Tainan (TW)

(72) Inventor: Cheng-Yen Tsai, Tainan (TW)

(73) Assignee: HUNDRED MACHINERY ENTERPRISE CO., LTD., Tainan (TW)

( * ) Notice: Subject to any disclaimer, the term of this patent is extended or adjusted under 35 U.S.C. 154(b) by 143 days.

(21) Appl. No.: 18/589,314

(22) Filed: Feb. 27, 2024

(65) Prior Publication Data
US 2025/0268267 A1 Aug. 28, 2025

(51) Int. Cl.
*A21C 11/10* (2006.01)
*A21C 11/16* (2006.01)

(52) U.S. Cl.
CPC .............. *A21C 11/10* (2013.01); *A21C 11/16* (2013.01)

(58) Field of Classification Search
CPC ... B26D 7/27; B26D 7/30; B26D 7/32; B26D 2210/02
See application file for complete search history.

(56) References Cited

U.S. PATENT DOCUMENTS

| | | | | |
|---|---|---|---|---|
| 3,824,885 | A * | 7/1974 | Marshall | B26D 7/30 83/176 |
| 6,314,851 | B1 * | 11/2001 | Graves | E06B 9/266 83/633 |
| 6,318,224 | B1 * | 11/2001 | Hoyland | B26D 7/32 83/155.1 |
| 7,007,595 | B2 * | 3/2006 | Ozery | B26D 7/30 83/77 |
| 8,892,239 | B2 * | 11/2014 | Weber | B26D 7/0683 700/109 |
| 8,893,599 | B2 * | 11/2014 | Reifenhaeuser | B26D 7/32 83/29 |
| 2003/0084770 | A1 * | 5/2003 | Gross | B26D 7/22 83/639.1 |
| 2004/0007110 | A1 * | 1/2004 | Long | B26D 7/0625 83/435 |
| 2004/0149098 | A1 * | 8/2004 | Freudinger | B26D 3/28 83/932 |
| 2008/0060494 | A1 * | 3/2008 | Mathues | B26D 7/04 83/932 |
| 2011/0167978 | A1 * | 7/2011 | Soyama | H10F 71/1375 83/699.51 |

(Continued)

Primary Examiner — Omar Flores Sanchez
(74) Attorney, Agent, or Firm — LANWAY IPR SERVICES; Chun-Ming Shih

(57) ABSTRACT

A cutting, forming, and adjusting device for a food processing machine includes a machine base, a cutting assembly, a support assembly, and an adjustment assembly. The support assembly is disposed under the cutting assembly and includes a sliding rod and a support board secured on the sliding rod. The adjustment assembly includes an adjusting transmission module connected with the sliding rod. The adjusting transmission module is also connected with an actuator. When an operator operates the actuator, the sliding rod and the support board are driven to move upward and downward, to adjust the starting position of the support board.

3 Claims, 6 Drawing Sheets

(56) References Cited

U.S. PATENT DOCUMENTS

| | | | |
|---|---|---|---|
| 2012/0048078 A1* | 3/2012 | Weber | B26D 1/143 83/13 |
| 2019/0161280 A1* | 5/2019 | Gill | B26F 3/004 |
| 2024/0158120 A1* | 5/2024 | Gropper | B65B 35/44 |
| 2024/0165757 A1* | 5/2024 | Yan | B23Q 1/58 |
| 2024/0261995 A1* | 8/2024 | Weiss | B26D 7/0625 |
| 2025/0073938 A1* | 3/2025 | Bernhard | B26D 7/30 |

* cited by examiner

CUTTING, FORMING, AND ADJUSTING DEVICE FOR FOOD PROCESSING MACHINE

BACKGROUND OF THE INVENTION

Field of the Invention

The present invention relates to a cutting, forming, and adjusting device for a food processing machine.

Description of the Related Art

A conventional food processing machine comprises a cutter and a catch plate located under the cutter. In practice, raw material is stirred into food puree. Then, the food puree is extruded to form a strip-shaped food dough or ball. Then, the extruded food dough passes through the cutter and is cut by the cutter. Thus, the food dough is cut into multiple food pieces by the cutter 23. The food pieces are dropped to the catch plate. A conveyor belt passes through the support board to transport the food pieces to a next working station for further processes. However, a starting position for lifting or lowering the catch plate cannot be adjusted manually. Sometimes, the falling distance of the food dough may need to be changed to adjust the appearance or shape of the food dough. In addition, when the temperature and humidity of the ambient environment is changed, the food dough is deformed too much or even damaged due to a long falling distance. Thus, the conventional food processing machine cannot solve the above problems if the starting position of the catch plate cannot be adjusted to change the falling distance of the food dough.

BRIEF SUMMARY OF THE INVENTION

The primary objective of the present invention is to provide a cutting, forming, and adjusting device for a food processing machine to facilitate the operator adjusting the starting position of the support board for lifting or lowering the support board.

In accordance with the present invention, there is provided a cutting, forming, and adjusting device for a food processing machine, comprising a machine base, a cutting assembly, a support assembly, and an adjustment assembly. The cutting assembly includes a lifter secured on the machine base. The lifter is connected with a lift transmission module. The lift transmission module is connected with a cutter. The cutter has an annular opening. The lift transmission module is also connected with a linkage. The support assembly includes a fixed seat secured on the machine base. The fixed seat is provided with a slideway. A sliding rod is mounted in the slideway. A support board is secured on the sliding rod and located under the annular opening. The adjustment assembly includes an adjusting transmission module mounted on the machine base. The adjusting transmission module is connected with the sliding rod. The adjusting transmission module is also connected with an actuator. The adjusting transmission module rests on the linkage.

In practice, the machine base is used to extrude and form a strip-shaped food dough. Then, the extruded food dough falls and extends through the annular opening of the cutter. Then, the lifter drives the lift transmission module which drives the cutter to rise through a determined distance and to cut the food dough into multiple food pieces.

In addition, the lifter also drives the linkage during operation, and the linkage abuts the adjusting transmission module. Thus, when the lifter drives the cutter, the lifter also drives the sliding rod and the support board to rise or fall, so that the support board is lifted to a predetermined height to catch the food dough which is cut and falls. Then, the food dough is delivered to a next working station for further processes.

Further, the falling distance of the food dough may need to be changed to adjust the appearance or shape of the food dough or when the temperature and humidity of the ambient environment are changed, the food dough is deformed too much or even damaged due to a long falling distance. Thus, the on-site operator can manually operate the actuator which drives the adjusting transmission module which drives the sliding rod to move upward or downward, so that the support board is lifted or lowered to adjust the starting position of the support board.

Therefore, the cutting, forming, and adjusting device can be used to adjust the appearance of the food dough, and to prevent the product quality of the cut food dough being affected by the environment.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
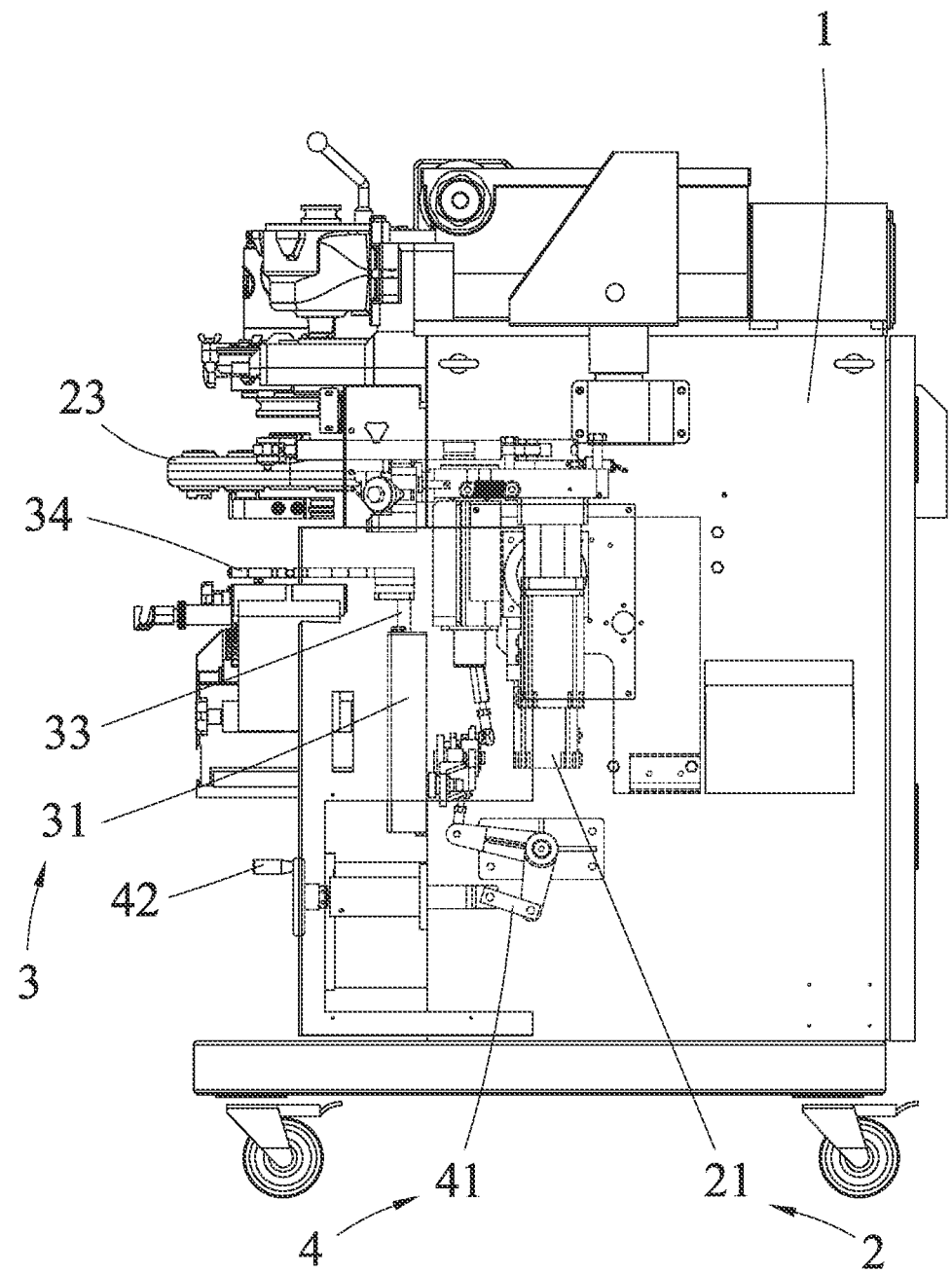
FIG. 1 is a schematic planar view of a cutting, forming, and adjusting device for a food processing machine in accordance with the preferred embodiment of the present invention.
Figure 2:
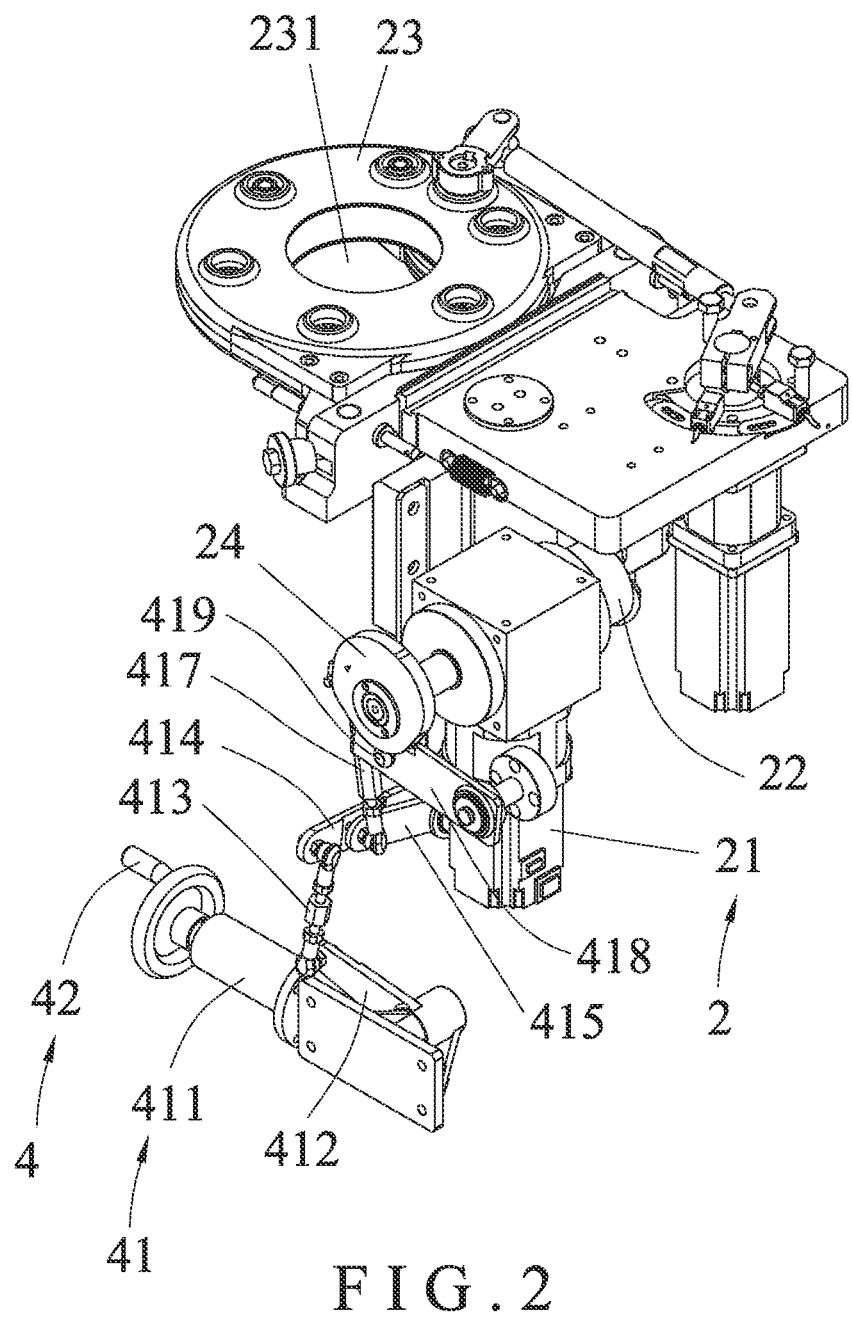
FIG. 2 is a partial perspective view of the cutting, forming, and adjusting device for a food processing machine in accordance with the preferred embodiment of the present invention.
Figure 3:
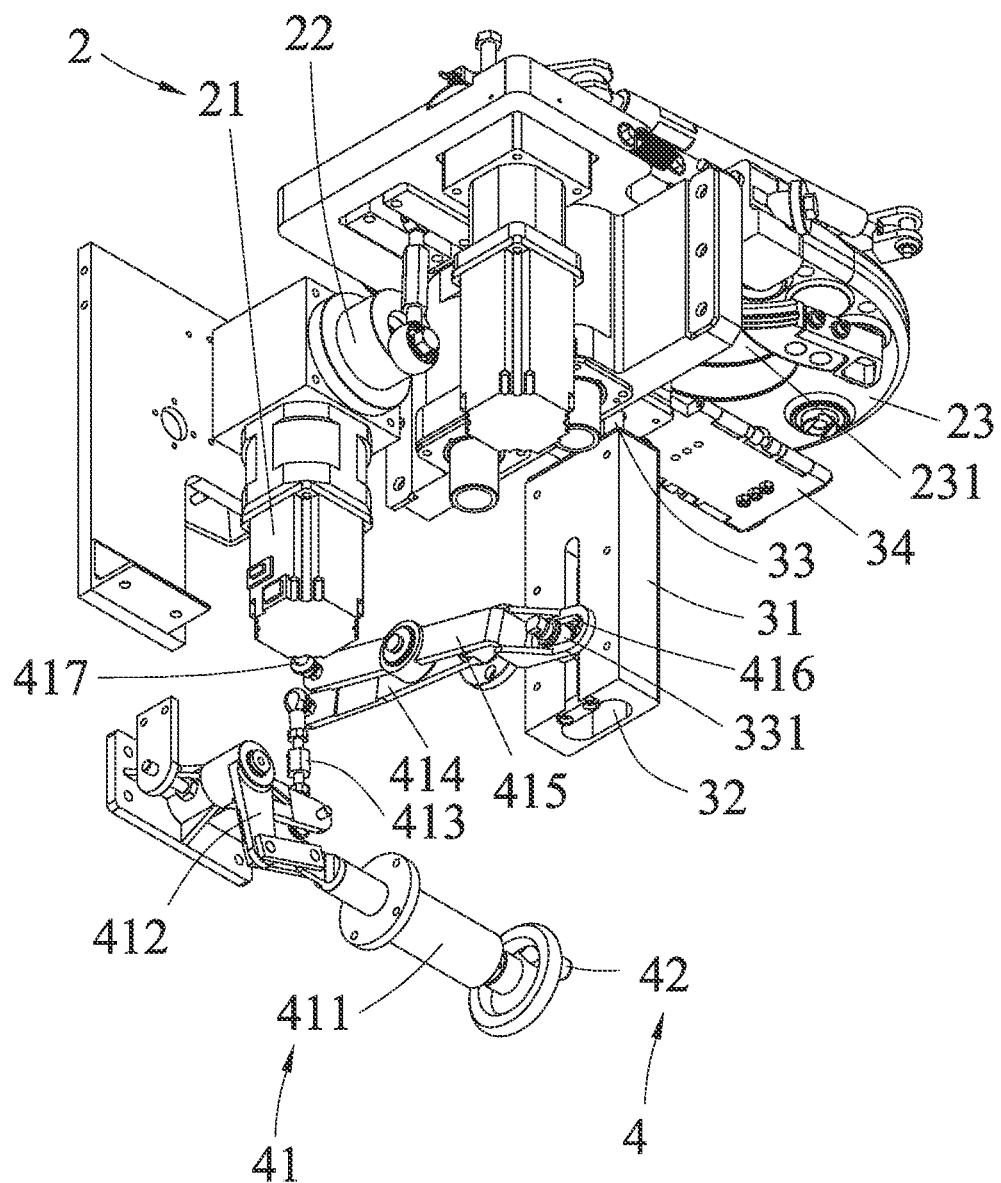
FIG. 3 is another partial perspective view of the cutting, forming, and adjusting device for a food processing machine in accordance with the preferred embodiment of the present invention.
Figure 4:
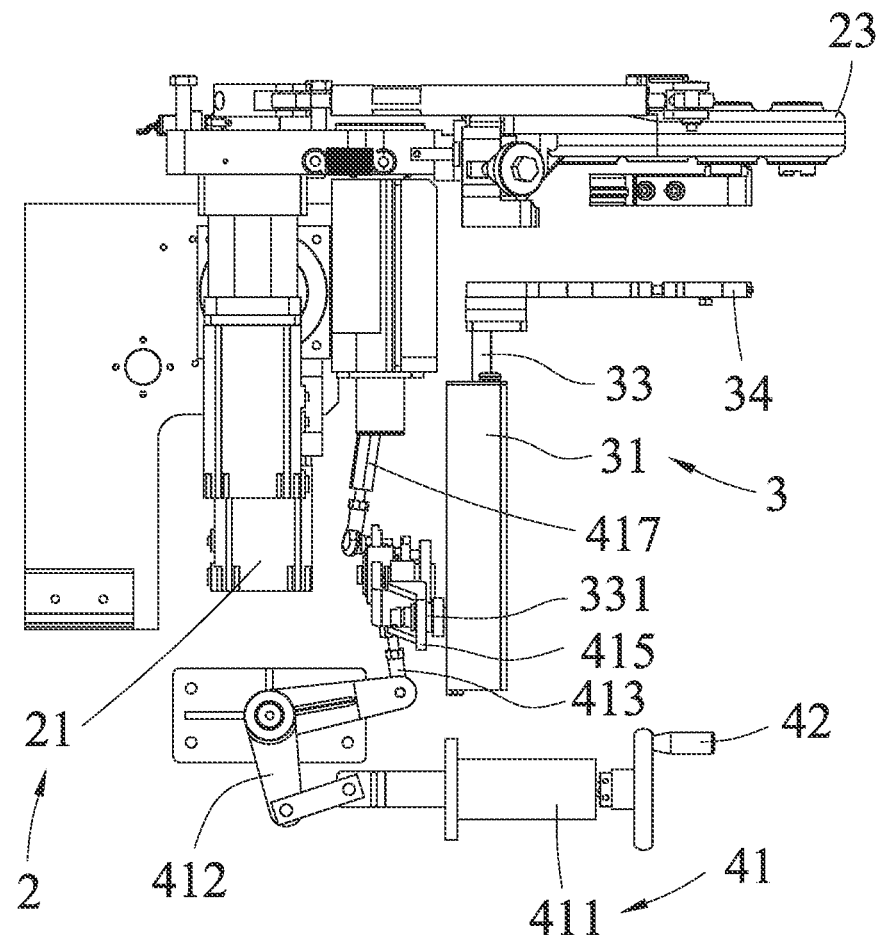
FIG. 4 is a partial side planar view of the cutting, forming, and adjusting device for a food processing machine in accordance with the preferred embodiment of the present invention.

Referring to the drawings and initially to FIGS. 1-4, a cutting, forming, and adjusting device for a food processing machine in accordance with the preferred embodiment of the present invention comprises a machine base 1, a cutting assembly 2, a support (or bearing) assembly 3, and an adjustment assembly 4.

The cutting assembly 2 includes a lifter 21 secured on the machine base 1. The lifter 21 is connected with a lift transmission module 22. The lift transmission module 22 is connected with a cutter 23. The cutter 23 has an annular opening 231. The lift transmission module 22 is also connected with a linkage 24.

The support assembly 3 includes a fixed seat 31 secured on the machine base 1. The fixed seat 31 is provided with a slideway 32. A sliding rod 33 is mounted in the slideway 32. A support board (or receiving plate) 34 is secured on the sliding rod 33 and located under the annular opening 231.

The adjustment assembly 4 includes an adjusting transmission module 41 mounted on the machine base 1. The adjusting transmission module 41 is connected with the sliding rod 33. The adjusting transmission module 41 is also connected with an actuator (or driver) 42. The adjusting transmission module 41 rests on the linkage 24.

In the preferred embodiment of the present invention, the actuator 42 is a hand wheel that can be rotated.

In practice, the machine base 1 stirs raw materials into food puree, and then extrudes the food puree into a long strip-shaped food dough. Then, the extruded food dough falls and extends through the annular opening 231 of the cutter 23. Then, the lifter 21 drives the lift transmission module 22 which drives the cutter 23 to move longitudinally and to rise through a determined distance so that the food dough is cut into multiple food pieces by the cutter 23. The food pieces are dropped to the support board 34. A conveyor belt passes through the support board 34 to transport the food pieces to a next working station for further processes, such as shaping, filling, or directly placing on a baking pan. In addition, the lifter 21 also drives the linkage 24 during operation. The linkage 24 abuts the adjusting transmission module 41. Thus, when the lifter 21 drives the cutter 23, the lifter 21 also drives the sliding rod 33 and the support board 34 to rise or fall, so that the support board 34 is lifted to a predetermined height to catch the food dough.

Figure 5:
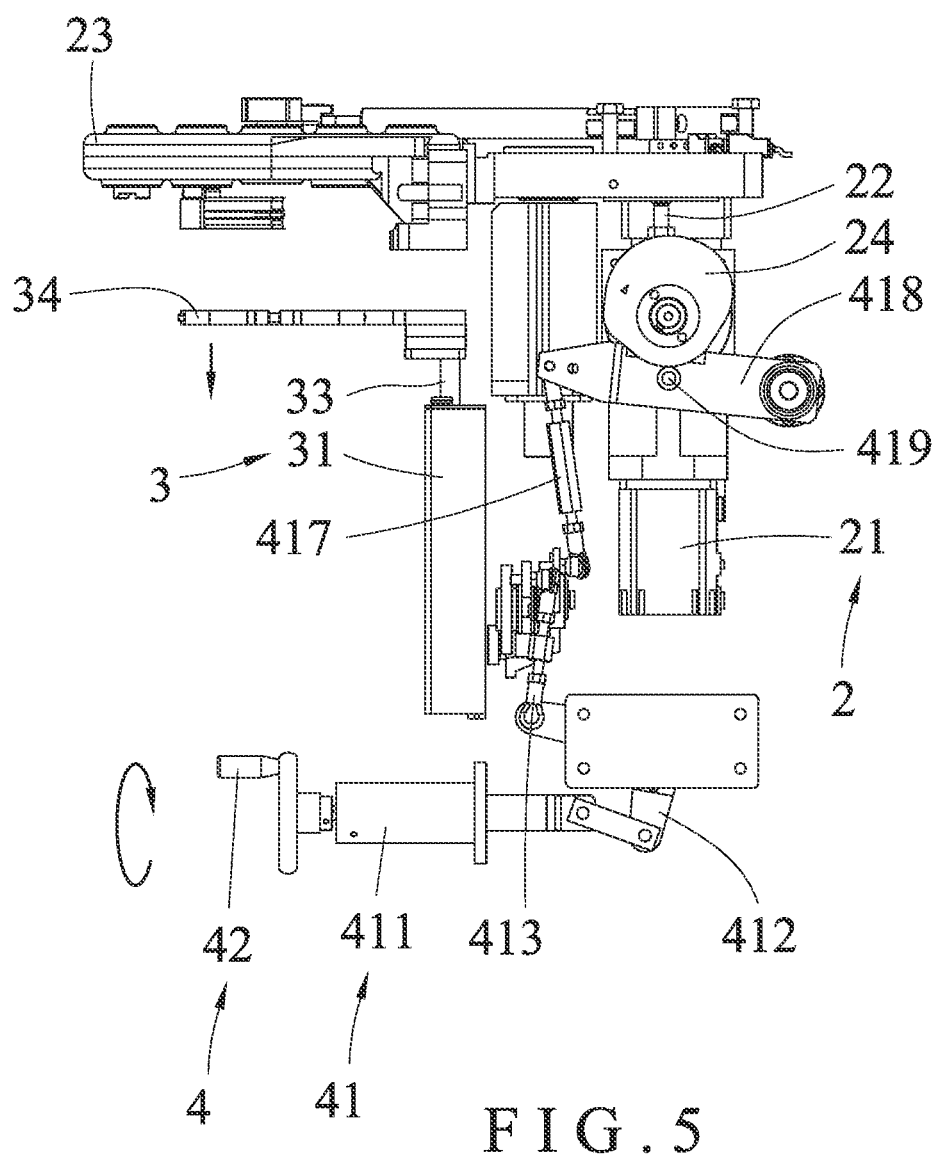
FIG. 5 is a schematic planar view showing the support board is adjusted downward.
Figure 6:
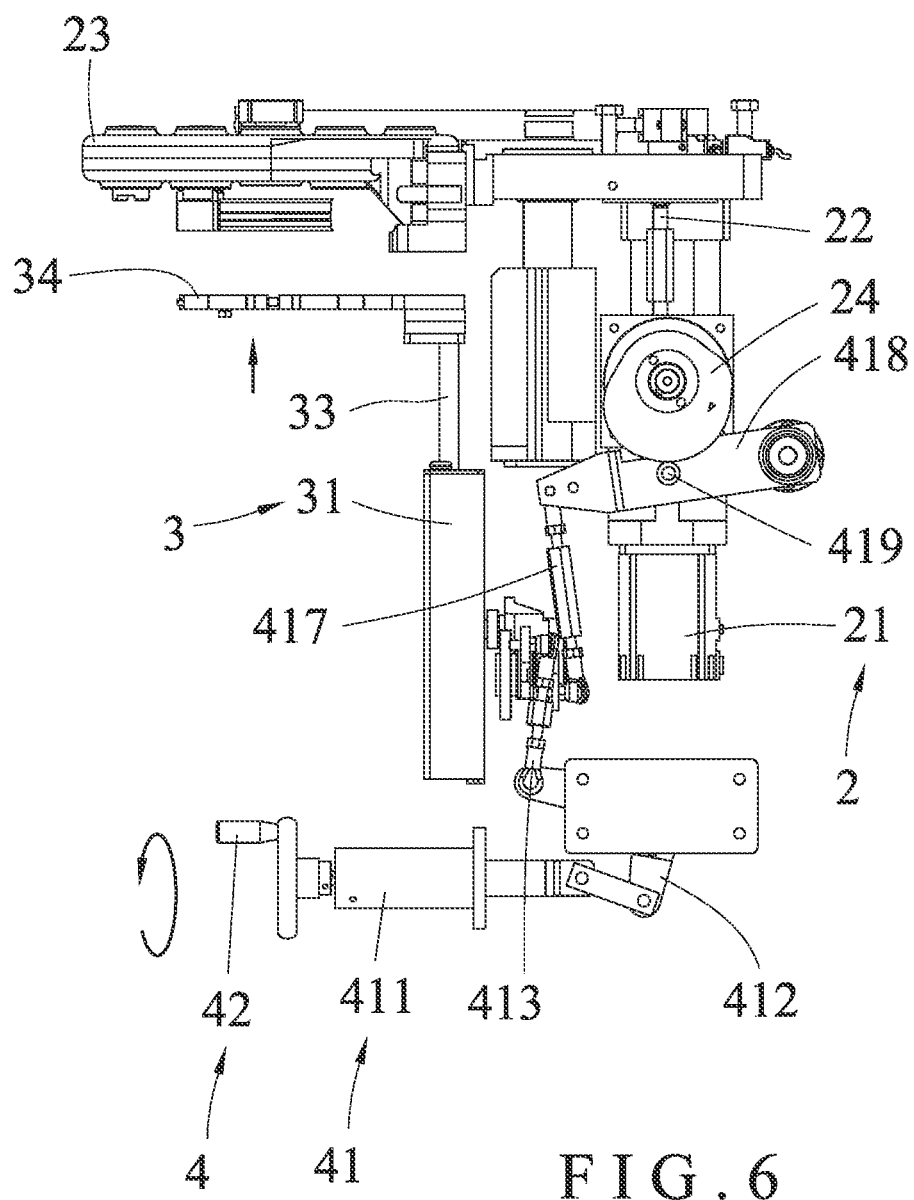
FIG. 6 is a schematic planar view showing the support board is adjusted upward.

Referring to FIGS. 5 and 6 with reference to FIGS. 1-4, the food dough may have different appearance or shape requirements. In addition, when the temperature and humidity of the ambient environment are changed, the food dough is deformed too much or even damaged due to a long falling distance. Thus, the on-site operator can manually operate the actuator 42 which drives the adjusting transmission module 41 which drives the sliding rod 33 to move upward or downward, so that the support board 34 is lifted or lowered to adjust the starting position of the support board 34. For example, the starting position of the support board 34 is lifted to decrease the falling distance so that the food dough is kept at a tall and straight shape. Alternatively, the starting position of the support board 34 is lowered to increase the falling distance so that the food dough is kept at a flat shape.

In the preferred embodiment of the present invention, the linkage 24 includes a cam. A driving portion 331 extends from the sliding rod 33. The adjusting transmission module 41 includes an action transformation (or change) group 411 connected with the actuator 42. The action transformation group 411 is pivotally connected with a first swinging lever 412. The first swinging lever 412 is pivotally connected with a first transmission rod 413 by a ball joint. The first transmission rod 413 is pivotally connected with a second swinging lever 414 by a ball joint. The second swinging lever 414 is pivotally connected with the machine base 1. The second swinging lever 414 has a mediate section pivotally connected with a mediate section of a third swinging lever 415. The third swinging lever 415 has a first end provided with a driving slot 416 mounted on the driving portion 331 and a second end pivotally connected with a second transmission rod 417 by a ball joint. The second transmission rod 417 is pivotally connected with a fourth swinging lever 418 by a ball joint. The fourth swinging lever 418 is pivotally connected with the machine base 1. The fourth swinging lever 418 has an outside formed with a protruding pillar 419 resting on the linkage 24.

In operation of the cutting process, the lifter 21 drives the linkage 24 to rotate. When the linkage 24 is rotated to a position where the larger portion of the diameter of the linkage 24 pushes the protruding pillar 419 downward, the fourth swinging lever 418 and the second transmission rod 417 presses one end of the third swinging lever 415 downward and lifts the other end of the third swinging lever 415, so that the sliding rod 33 and the support board 34 are lifted to catch the food dough. When the linkage 24 is rotated to a position where the smaller portion of the diameter of the linkage 24 rests on the protruding pillar 419, the sliding rod 33 and the support board 34 are lowered by the gravity. Thus, the third swinging lever 415 is moved like a seesaw and drives the support board 34 to move upward or downward.

When the operator wishes to adjust the starting position of the support board 34, the actuator 42 is rotated which drives the action transformation group 411 which in turn drives and swings the first swinging lever 412, the first transmission rod 413, and the second swinging lever 414. Then, the second swinging lever 414 drives the third swinging lever 415 which drives the driving portion 331 of the sliding rod 33, to adjust the starting position of the support board 34. In such a manner, the linkage 24 has a fixed shape, so that the moving (lifting or lowering) distance of the support board 34 is fixed. Thus, the starting position of the support board 34 is adjusted to change the falling distance of the food dough.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A cutting, forming, and adjusting device for a food processing machine, comprising:
   a machine base, a cutting assembly, a support assembly, and an adjustment assembly;
   wherein:
   the cutting assembly includes a lifter secured on the machine base;
   the lifter is connected with a lift transmission module;
   the lift transmission module is connected with a cutter;
   the cutter has an annular opening;
   the lift transmission module is also connected with a linkage;
   the support assembly includes a fixed seat secured on the machine base;
   the fixed seat is provided with a slideway;
   a sliding rod is mounted in the slideway;
   a support board is secured on the sliding rod and located under the annular opening;
   the adjustment assembly includes an adjusting transmission module mounted on the machine base;
   the adjusting transmission module is connected with the sliding rod;
   the adjusting transmission module is also connected with an actuator; and
   the adjusting transmission module rests on the linkage.

2. The cutting, forming, and adjusting device for a food processing machine as claimed in claim 1, wherein the actuator is a hand wheel.

3. The cutting, forming, and adjusting device for a food processing machine as claimed in claim 1, wherein:

the linkage includes a cam;
a driving portion extends from the sliding rod;
the adjusting transmission module includes an action transformation group connected with the actuator;
the action transformation group is pivotally connected with a first swinging lever;
the first swinging lever is pivotally connected with a first transmission rod by a ball joint;
the first transmission rod is pivotally connected with a second swinging lever by a ball joint;
the second swinging lever is pivotally connected with the machine base;
the second swinging lever has a mediate section pivotally connected with a mediate section of a third swinging lever;
the third swinging lever has a first end provided with a driving slot mounted on the driving portion and a second end pivotally connected with a second transmission rod by a ball joint;
the second transmission rod is pivotally connected with a fourth swinging lever by a ball joint;
the fourth swinging lever is pivotally connected with the machine base;
the fourth swinging lever has an outside formed with a protruding pillar resting on the linkage.

* * * * *